US009728056B2

(12) United States Patent
Braxton

(10) Patent No.: US 9,728,056 B2
(45) Date of Patent: Aug. 8, 2017

(54) PROXIMITY ALERTING SYSTEMS AND METHODS

(71) Applicant: GroupCare Technologies, LLC, Boca Raton, FL (US)

(72) Inventor: Mark D. Braxton, Barton, NY (US)

(73) Assignee: GroupCare Technologies, LLC, Boca Raton, FL (US)

( * ) Notice: Subject to any disclaimer, the term of this patent is extended or adjusted under 35 U.S.C. 154(b) by 0 days.

(21) Appl. No.: 15/142,182

(22) Filed: Apr. 29, 2016

(65) Prior Publication Data

US 2016/0321898 A1  Nov. 3, 2016

Related U.S. Application Data

(60) Provisional application No. 62/155,318, filed on Apr. 30, 2015.

(51) Int. Cl.
*G08B 13/00* (2006.01)
*G08B 13/24* (2006.01)
*H04W 4/02* (2009.01)

(52) U.S. Cl.
CPC ........ *G08B 13/2491* (2013.01); *H04W 4/021* (2013.01)

(58) Field of Classification Search
CPC .......................... G08B 13/2491; H04W 4/021
See application file for complete search history.

(56) References Cited

U.S. PATENT DOCUMENTS

| | | | | |
|---|---|---|---|---|
| 2013/0044612 A1* | 2/2013 | Hirsch | ................. | H04W 84/12 370/252 |
| 2013/0113993 A1* | 5/2013 | Dagit, III | ................. | G06F 3/017 348/552 |
| 2014/0030982 A1* | 1/2014 | Cardona | ................. | G01S 5/14 455/67.11 |
| 2014/0302842 A1* | 10/2014 | Lloyd | ................. | H04L 41/0806 455/426.1 |
| 2014/0370879 A1* | 12/2014 | Redding | ................. | H04W 4/001 455/419 |
| 2015/0063139 A1* | 3/2015 | Zhang | ................. | H04W 24/08 370/252 |
| 2015/0093990 A1* | 4/2015 | Lin | ................. | H04W 4/008 455/41.2 |

(Continued)

*Primary Examiner* — Erin File
(74) *Attorney, Agent, or Firm* — Greenberg Traurig, LLP; Chinh H. Pham; Todd C. Basile

(57) ABSTRACT

Systems and methods for detecting a breach of a proximity threshold associated with a first electronic device comprising a first electronic device configured to transmit a first wireless signal; and a second electronic device configured to: 1) measure a strength of the first wireless signal, 2) determine, based on the measured strength of the first wireless signal, a proximity of the second electronic device to the first electronic device, 3) instruct the first electronic device, via a second wireless signal, to subsequently transmit the first wireless signal at a predetermined interval corresponding with a proximity of the second electronic device to a proximity threshold associated with the first electronic device, and 4) measure a strength of the first wireless signal being transmitted at the predetermined interval to detect when the second electronic device breaches the proximity threshold associated with the first electronic device.

6 Claims, 9 Drawing Sheets

Directional beacons 124a and 124b act as sentries near Door A and Door B, respectively, and have substantially overlapping tracking signal fields near Doors A and B. Each can be used by locator 110 to validate apparent breaches detected by its counterpart at Door A and Door B.

(56) References Cited

U.S. PATENT DOCUMENTS

2015/0296553 A1* 10/2015 DiFranco ............ H04W 76/023
                                                           455/41.2
2016/0255473 A1*  9/2016 Abraham ................ G01S 11/06

* cited by examiner

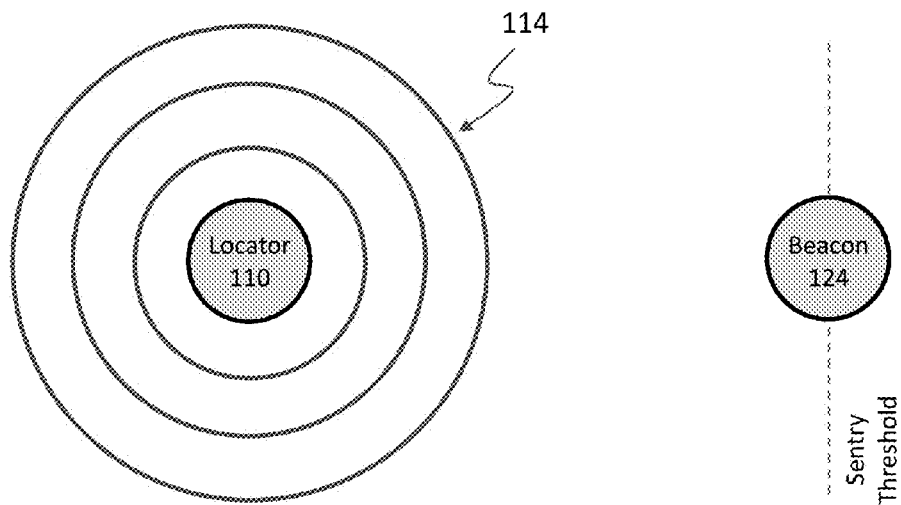
FIGURE 1A - Locator periodically emits a search signal. Beacon out of range (or beyond predetermined threshold) of locator.
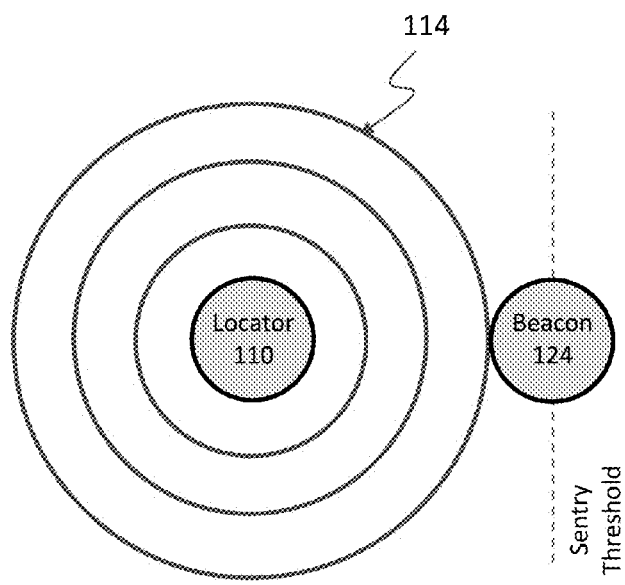
FIGURE 1B – Locator moves closer; beacon now within range (or within predetermined proximity) of locator search signal.

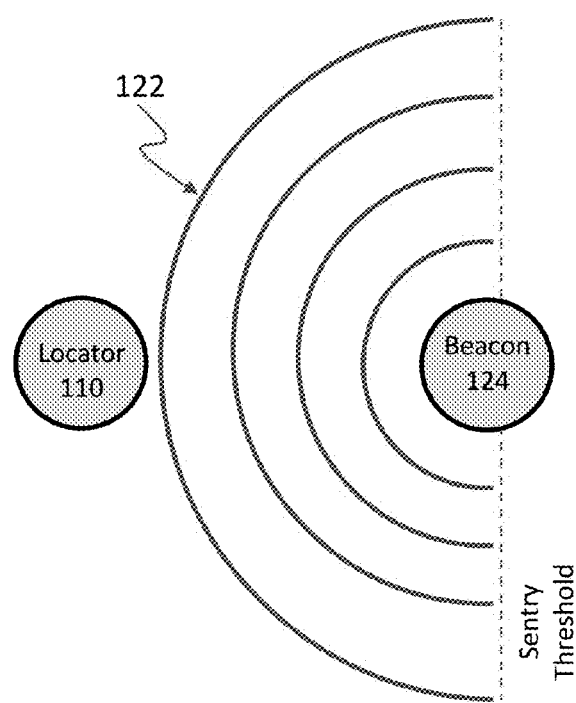
FIGURE 1C – Beacon responds to locator search signal.
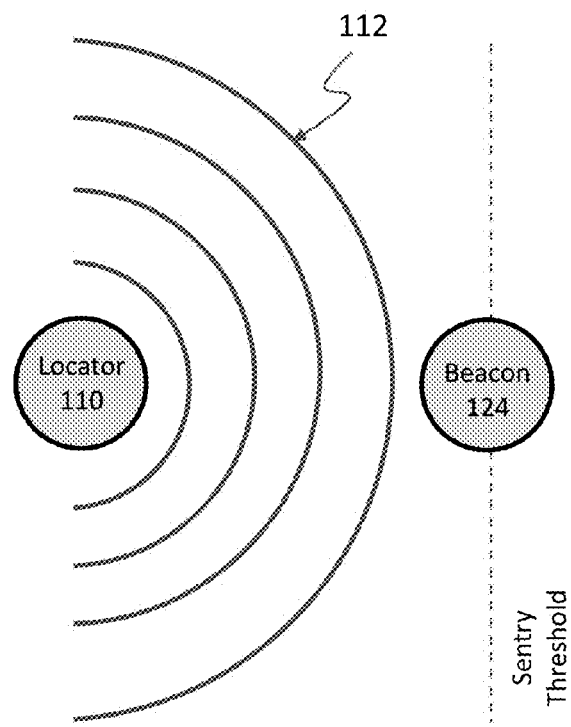
FIGURE 1D – Locator measures RSSI of beacon signal, and sends corresponding configuration message to beacon.

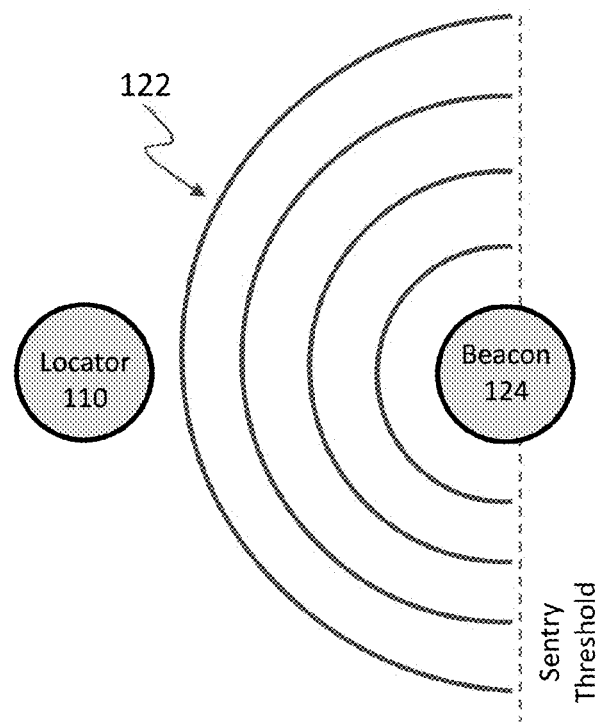
FIGURE 1E – Beacon applies configuration changes; emits signal to locator.
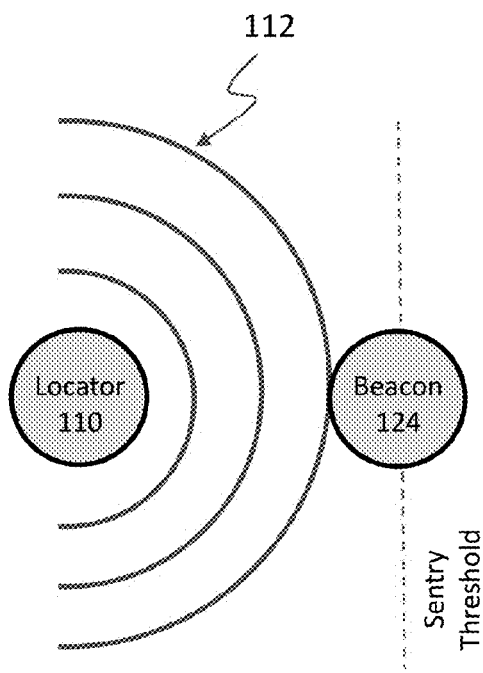
FIGURE 1F – Locator continues moving closer to beacon. Locator measures RSSI of beacon signal; sends corresponding configuration message to beacon.

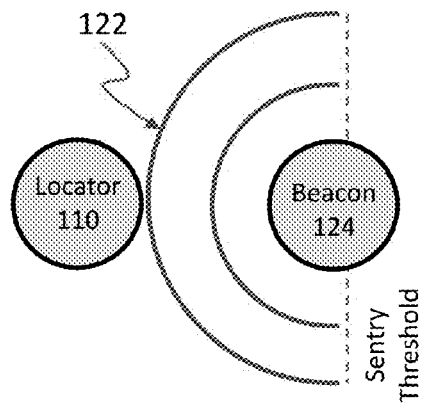

FIGURE 1G – Beacon applies configuration changes; emits signal to locator

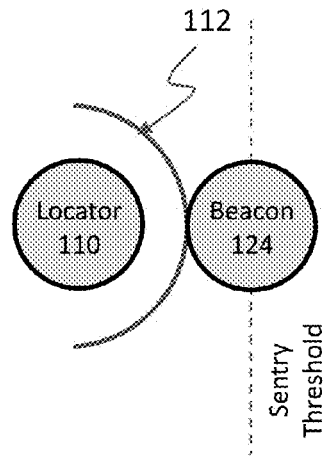

FIGURE 1H – Locator continues moving closer to beacon. Locator measures RSSI of beacon signal; sends corresponding configuration message to beacon.

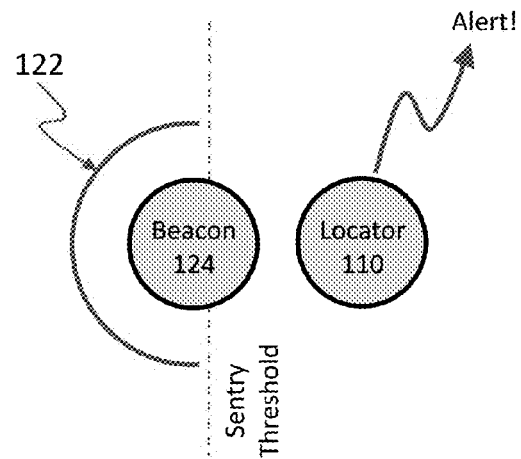

FIGURE 1I – Beacon applies configuration changes; emits signal to locator. Locator has moved past beacon, and detects sharp drop off in beacon RSSI. Locator sends alert.

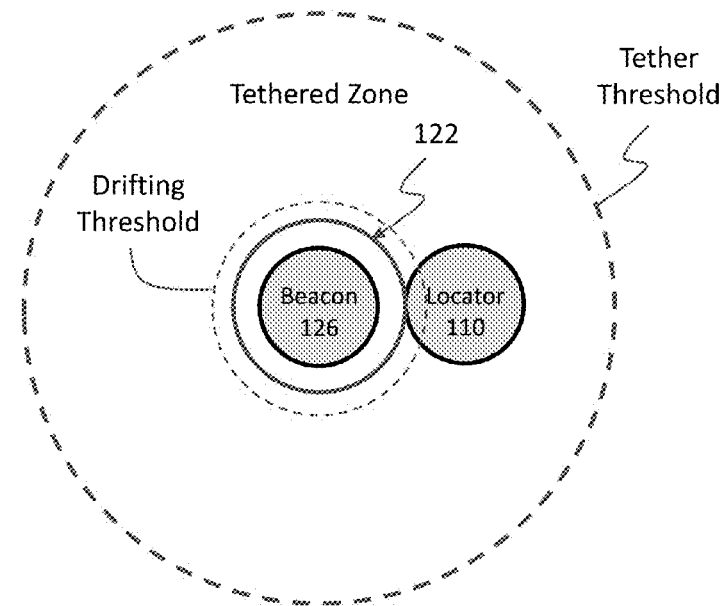
FIGURE 2A – Locator within intermediate proximity threshold of beacon. Beacon emits tracking signal periodically; locator monitors RSSI of beacon tracking signal to determine proximity.
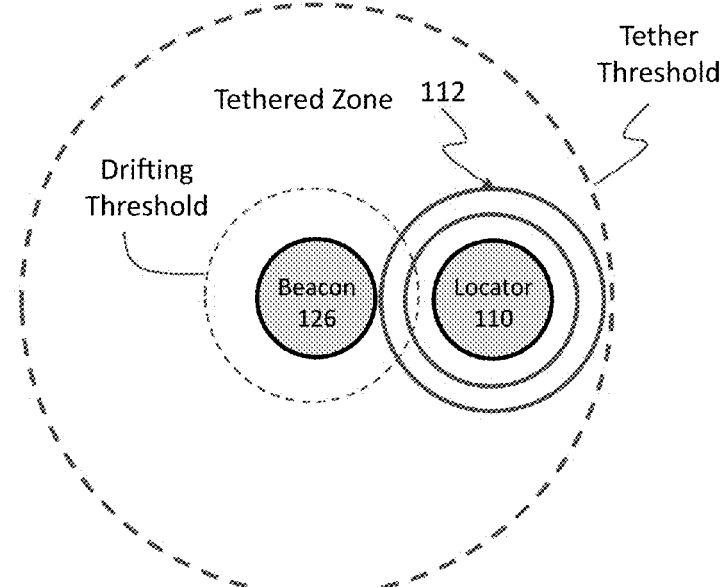
FIGURE 2B – Locator measures RSSI of beacon signal; determines its location has exceeded intermediate proximity threshold and sends configuration message to beacon.

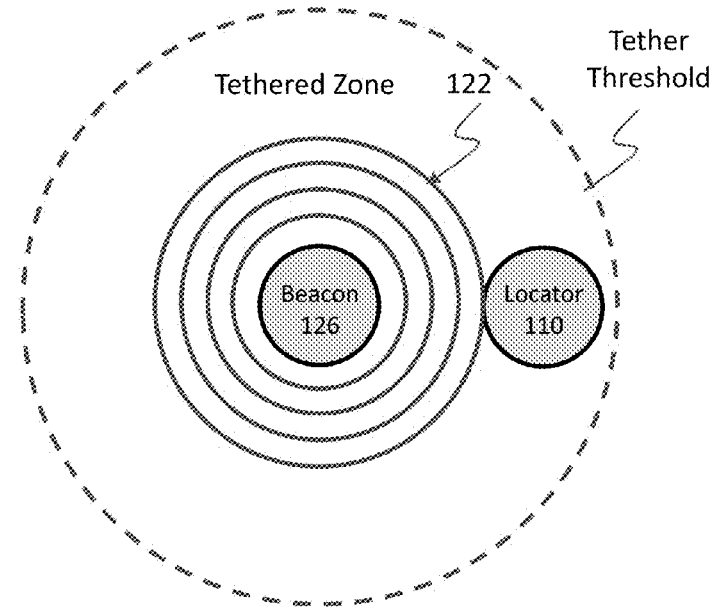
FIGURE 2C – Locator continues moving away from beacon. Beacon applies configuration and emits signal.
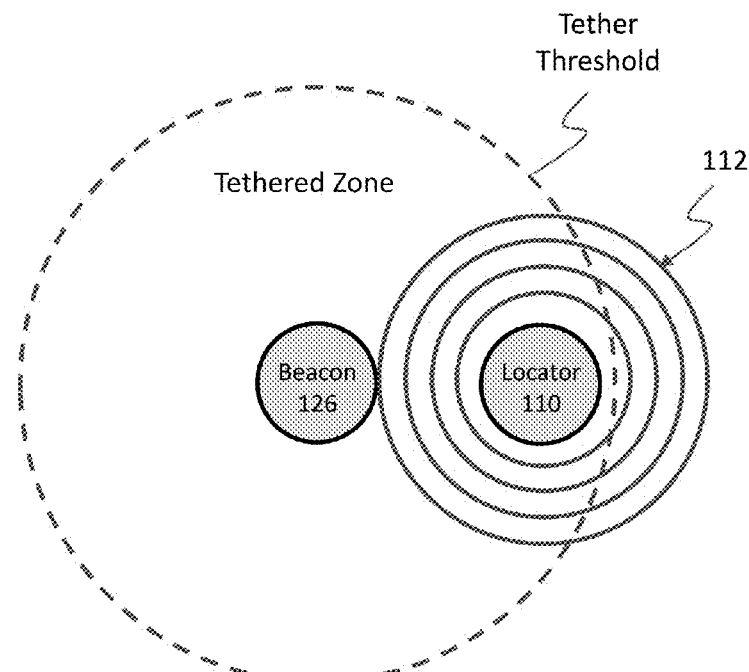
FIGURE 2D – Locator measures RSSI of beacon signal, and determines that it is about to leave the tethered proximity. Locator sends configuration message to beacon.

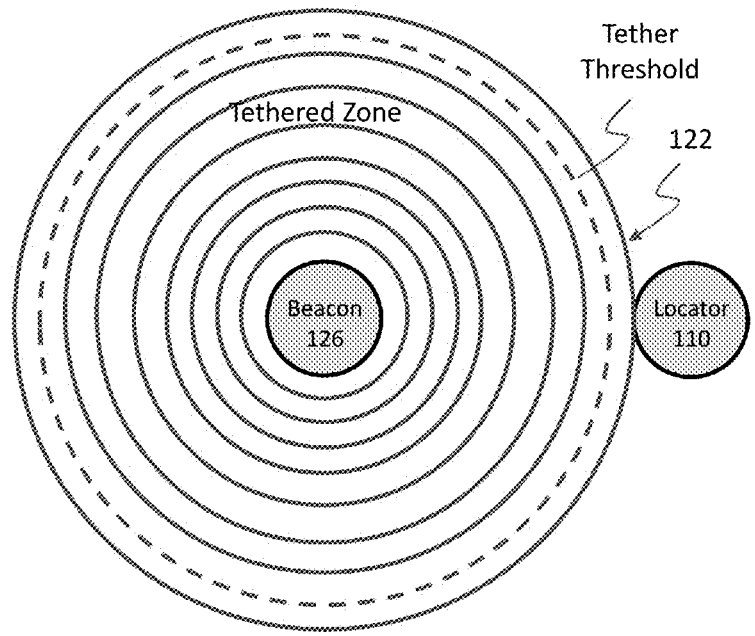
FIGURE 2E – Locator continues moving away from beacon. Beacon applies configuration and emits signal.
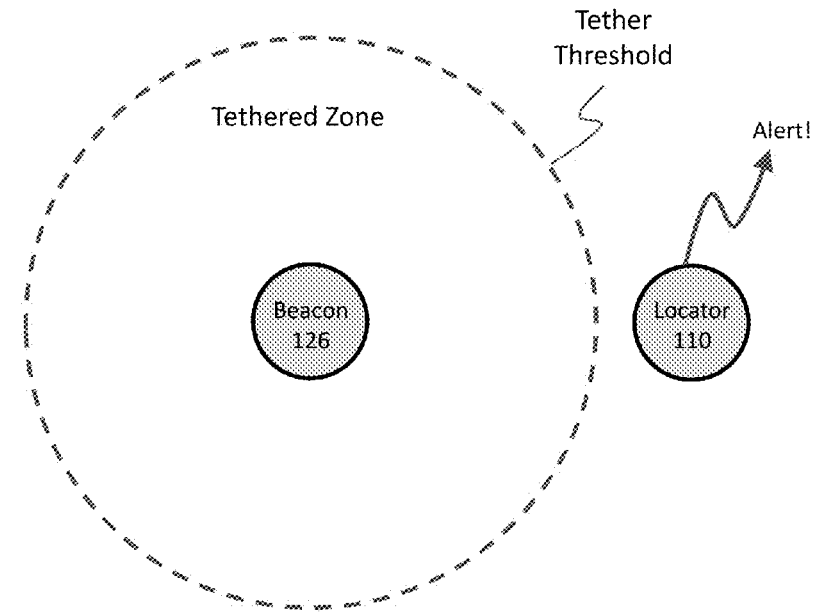
FIGURE 2F – Locator measures RSSI of beacon signal, and determines that it has left tethered zone. Locator sends alert.

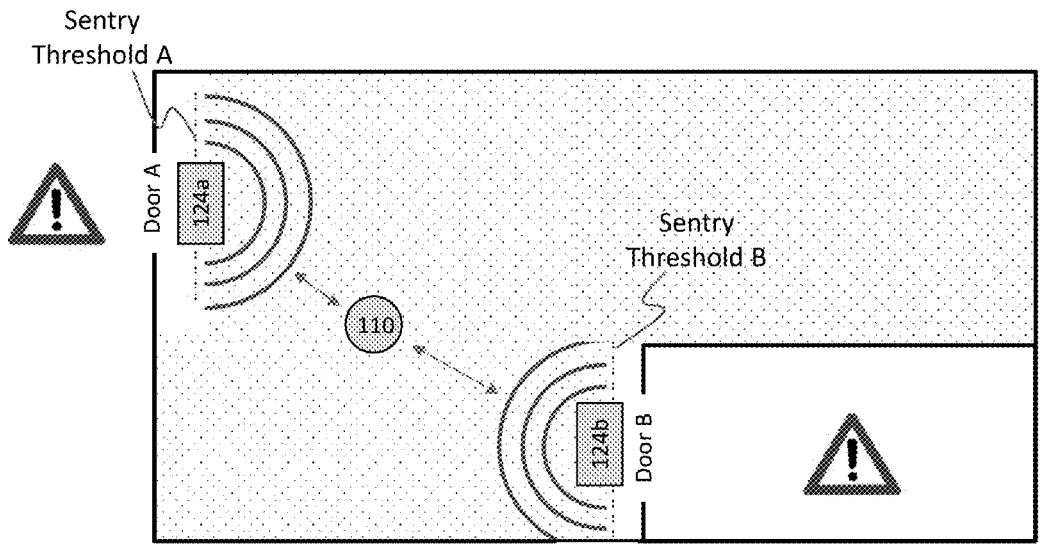

FIGURE 3 – Directional beacons 124a and 124b act as sentries near Door A and Door B, respectively, and have substantially overlapping tracking signal fields near Doors A and B. Each can be used by locator 110 to validate apparent breaches detected by its counterpart at Door A and Door B.

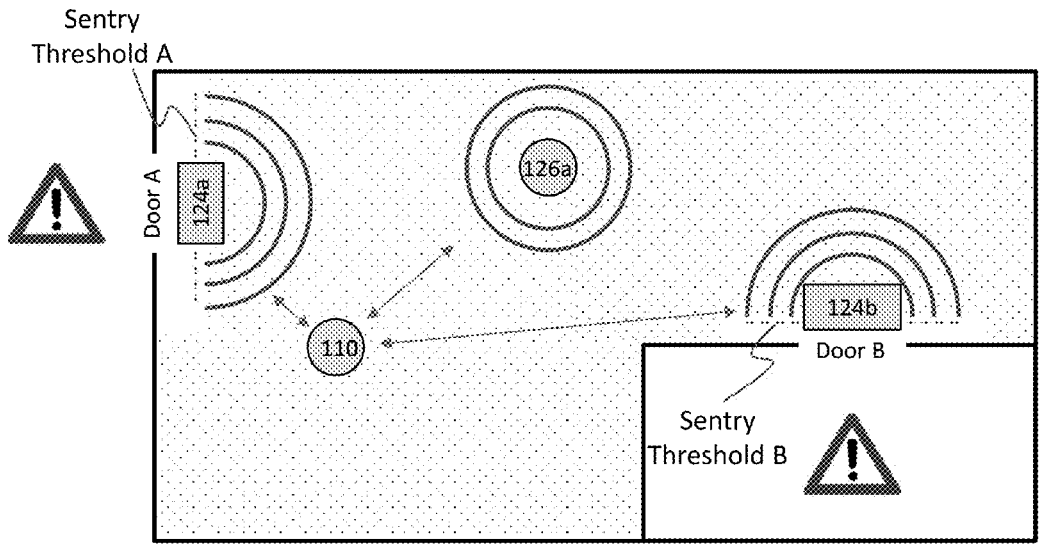

FIGURE 4 – Directional beacons 124a and 124b act as sentries near Door A and Door B, respectively, but do not have overlapping signal fields near Door A. Omnidirectional beacon 126a can be provided for validation at Door A, as well as for additional validation robustness at Door B.

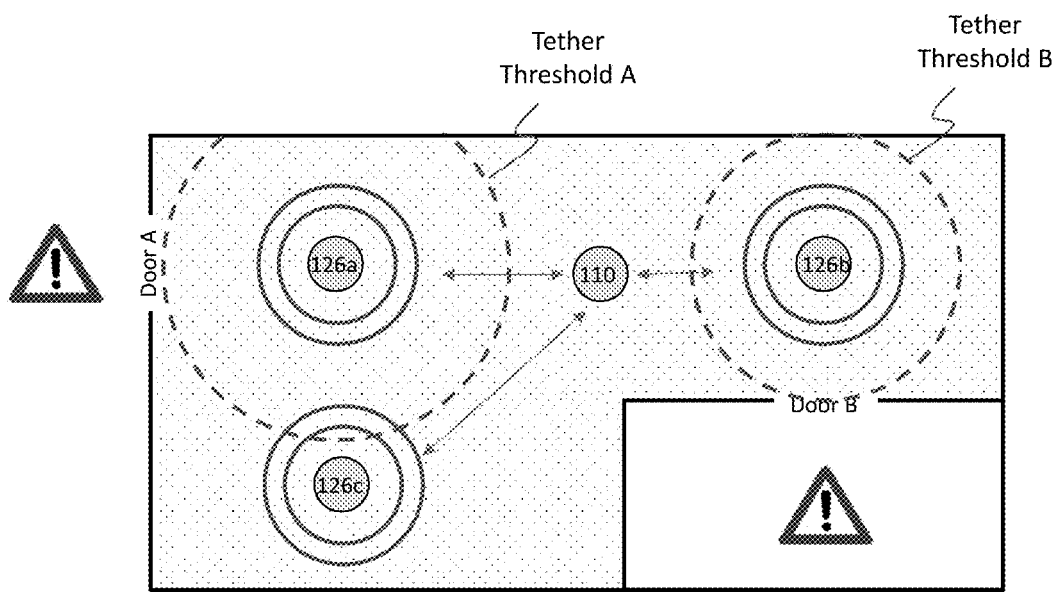
FIGURE 5 – Omnidirectional beacons 126a, 126b, 126c provide coverage across L-shaped safe zone. Omnidirectional beacons 126a can validate omnidirectional beacon 126b near Door B, and a combination of beacons 126b, 126c can be used to validate beacon 126a near Door A.

PROXIMITY ALERTING SYSTEMS AND METHODS

RELATED U.S. APPLICATIONS

This application claims priority to U.S. Provisional Patent Application Ser. No. 62/155,318, filed Apr. 30, 2015, which is incorporated herein by reference in its entirety for all purposes.

TECHNICAL FIELD

The present invention relates to systems and methods for monitoring the proximity of locator device 110 to beacon device 120 to detect breaches of established safe zone and/or keep-out zone boundaries.

BACKGROUND

Existing solutions for monitoring the location of an electronic device, and detecting when it has crossed a geofence or other spatial zone boundary suffer from a number of disadvantages. Many such solutions require known coordinates of reference points to triangulate the location of the electronic device. Other such solutions require long-range communications with satellite, cellular towers, or other WAN to monitor the location of the electronic device within the bounds of the geofence. These and other issues can lead to complex, expensive, and power-intensive systems that require long range connectivity.

In light of these issues, it would be desirable to provide a system that can establish a geofence or similar spatial zone boundaries and detect when an electronic device has breached the geofence or boundaries without the need for complex triangulation operations and setup procedures.

SUMMARY OF THE INVENTION

The present disclosure is directed to a system for detecting a breach of a proximity threshold associated with a first electronic device. The system may comprise first and second electronic device configured for bi-directional communication with one another. The second electronic device may be configured to measure a strength of a first wireless signal transmitted by the first electronic device and determine, based on the measured strength of the first wireless signal, a proximity of the second electronic device to the first electronic device. The second electronic device may instruct the first electronic device, via a second wireless signal, to subsequently transmit the first wireless signal at a predetermined interval corresponding with a proximity of the second electronic device to a proximity threshold associated with the first electronic device. The second electronic device may then measure a strength of the first wireless signal being transmitted at the predetermined interval to detect when the second electronic device breaches the proximity threshold associated with the first electronic device.

In another aspect, the present disclosure is directed to a method for detecting a breach of a proximity threshold associated with a first electronic device. The method may include transmitting a first wireless signal from a first wireless device, measuring a strength of the first wireless signal with a second electronic device, and determining, based on the measured strength of the first wireless signal, a proximity of the second electronic device to the first electronic device. The first electronic device may be instructed, via a second wireless signal transmitted from the second electronic device, to subsequently transmit the first wireless signal at a predetermined interval corresponding with a proximity of the second electronic device to a proximity threshold associated with the first electronic device. The second electronic device may then measure a strength of the first wireless signal being transmitted at the predetermined interval to detect when the second electronic device breaches the proximity threshold associated with the first electronic device.

BRIEF DESCRIPTION OF DRAWINGS

For a more complete understanding of this disclosure, reference is now made to the following description, taken in conjunction with the accompanying drawings, in which:

FIGS. 1A-1I schematically depict systems and methods for detecting a breach of a sentry proximity threshold established by a directional beacon, in accordance with one embodiment of the present disclosure;

FIGS. 2A-2F schematically depict systems and methods for detecting a breach of a tether proximity threshold established by an omnidirectional beacon, in accordance with one embodiment of the present disclosure;

FIG. 3 schematically depicts a multi-beacon system for validating apparent proximity threshold breaches, in accordance with one embodiment of the present disclosure;

FIG. 4 schematically depicts a multi-beacon system for validating apparent proximity threshold breaches, in accordance with one embodiment of the present disclosure; and FIG. 5 schematically depicts a multi-beacon system for validating apparent proximity threshold breaches, in accordance with one embodiment of the present disclosure.

DESCRIPTION OF SPECIFIC EMBODIMENTS

Embodiments of the present disclosure generally provide system 100 and associated methods for utilizing two-way communication between a locator device 110 and beacon device 120 for use in monitoring proximity of locator device 110 to beacon device 120. Embodiments of system 100 may provide for measuring a signal strength of a tracking signal 122 emitted by beacon 120 and in response, controlling, via an instruction signal 112 emitted by locator 110, a configuration of subsequent tracking signals 122 emitted by beacon 120. These and other features may provide for the ability to establish virtual "safe zones" and/or "keep-out" zones, and to detect when locator 110 breaches these zones so that protocol for responding to the breach may be initiated.

Unlike vector-based triangulation technologies, various embodiments of the present disclosure do not require known coordinates of beacon(s) 120 or other reference stations to establish safe zones and keep-out zones, and monitor them for associated breaches. Instead, system 100 utilizes proximity thresholds to establish these zones and monitors the proximity of a locator 110 relative to these thresholds to determine, without knowing specific coordinates, when a breach occurs. This advantageously results in a system that may be set up and initialized with minimal time and cost. Further, bi-directional communications between locator 110 and beacon(s) 120 allows for locator 110 to control the configurations of tracking signals 122 emitted from beacon(s) 120 to optimize the detection of zone breaches, as later described in more detail.

Locator 110, in various embodiments, may include any suitable electronic device configured for sending and receiving wireless signals 112, 122, respectively. In an embodiment, locator 110 may be a wearable electronic device, such as a locator watch, anklet, pendant, animal collar, configured to be worn or carried by a person or animal. In another embodiment, locator 110 may be a mobile phone or smart phone. Of course, the present disclosure is not intended to be limited to any particular embodiment of locator 110, and one of ordinary skill in the art will recognize other suitable electronic devices capable of performing the functions of locator 110.

Beacon 120, in various embodiments, may similarly include any suitable electronic device configured for sending and receiving wireless signals 122, 112, respectively. In some embodiments, beacon 120 may be configured for placement at or near ingress/egress points to stationary safe zones or keep-out zones so as to act as sentries, as later described in more detail. In other embodiments, beacon 120 may be configured for placement at or near a center of a safe zone so as to act as a tether for a stationary safe zone, as later described. In still further embodiments, beacon 120 may be configured to be worn or carried so as to act as a tether for a mobile safe zone, as later described in more detail.

Beacon 120, in various embodiments, may be configured to emit tracking signal 122 in only certain directions (i.e., directional), in all directions (i.e., omnidirectional), or a combination thereof. In some embodiments, beacon 120 may include a directional beacon 124 configured to emit tracking signal 122 about a portion of its circumference, such that tracking signal 122 propagates outward in a fan-shaped fashion. For example, in an embodiment, directional beacon 124 may be configured to direct tracking signal 122 to form a 180-degree field of coverage. In another embodiment, beacon 120 may include an omnidirectional beacon 126 configured to emit tracking signal 122 about its circumference, such that tracking signal 122 propagates outward in a circular or spherical pattern.

Of course, the present disclosure is not intended to be limited to any particular embodiment of beacon 120, and one of ordinary skill in the art will recognize other suitable electronic devices capable of performing the functions of beacon 120.

Wireless signals 112, 122 may include any suitable signal capable of being directly emitted and received between locator 110 and beacon 120. In various embodiments, signals 112, 122 may be radio frequency waves or the like. Signals 112, 122 may vary from longer range signals such as LoRa, Sigfox, CIoT (cellularInternet of Things) to mid-range signals such as WiFi, Bluetooth Low Energy (BLE), to short-range signals such as near field communication (NFC), Bluetooth Classic, Zigbee and others. Of course, any other suitable signal is envisioned within the scope of the present disclosure.

In this manner, locator 110 and beacon 120 may communicate with each other independent of connectivity with cellular, satellite, and other large-scale Wide Area Network (WAN) communications networks. This may be particularly useful if one or both of the devices cannot establish connectivity with such networks—for example, if the device(s) are in an area lacking cell tower coverage (e.g., a rural, wilderness, or indoor area), or an area suffering from atmospheric interference (e.g., cloud cover/storms) significant enough to interrupt satellite transmissions.

Sentry Beacons 124

FIGS. 1A-1I illustrate a representative embodiment in which a directional beacon 124 may be utilized to detect when locator 110 has moved across a predetermined threshold, such as an ingress/egress point (e.g., door, window) of a predefined zone or area (e.g., a room, building, yard). In this way, directional beacon 124 may be utilized as a sentry for detecting when locator 110 crosses into an unauthorized area ("keep-out" zone) and/or departs from an authorized area ("safe zone").

The predetermined threshold (also referred to herein as "sentry threshold"), in various embodiments, may be defined by the positioning and orientation of directional beacon 124. In an embodiment, directional beacon 124 may be positioned at or proximate to the desired location of the sentry threshold (e.g., in or just in front of a doorway), and oriented to face into a safe zone. The resulting sentry threshold will be created at the desired location, and will extend from that location in the directions defined by the width of the directional tracking signal 122 produced by the directional beacon 124. For example, a directional beacon 124 configured to produce a 180-degree tracking signal 122 may be placed in or just in front of a doorway (i.e., egress point from the safe zone) and oriented inwards such that the boundaries of the 180-degree tracking signal 122 extend substantially parallel with the plane of the doorway, so as to define a sentry threshold extending side-to-side across the doorway. As configured, directional beacon 124 may monitor the proximity of locator 110 to the doorway, and detect when locator 110 leaves the safe zone through the doorway. In another embodiment, directional beacon 124 may be positioned at or proximate to the desired location of the sentry threshold (e.g., in or just in front of a doorway), and oriented to face outwards from a keep-out zone. The resulting sentry threshold will be created at the desired location, and will extend in the directions defined by the width of the directional tracking signal produced by the directional beacon 124. For example, a directional beacon 124 configured to produce a 180-degree tracking signal 122 may be placed in or just in front of a doorway (i.e., ingress point into a keep-out zone) and oriented outwards such that the boundaries of the 180-degree signal extend substantially parallel with the plane of the doorway, so as to define a sentry threshold extending side-to-side across the doorway. As configured, directional beacon 124 may monitor the proximity of locator 110 to the doorway, and detect when locator 110 breaches or is substantially likely to breach the sentry threshold across the doorway based on movement, direction of travel, and/or learned past behavior.

While the present disclosure describes safe zones and keep-out zones in the context of walled rooms, and ingress/egress points in the context of doorways, it should be recognized that such zones may be established in any spatial context, whether contained within physical boundaries (e.g., walls, fences) or not, as may be the case with playgrounds, yards, certain areas of rooms, or any other suitable construct. The present disclosure is not intended to be limited to any particular spatial definition of a safe zone or keep-out zone, but rather envisions that sentry embodiments may serve to monitor the proximity of locator 110 and detect when it has crossed a predetermined sentry threshold.

Referring now to FIG. 1A, a 180-degree directional beacon 124 may be positioned and oriented to define a desired sentry threshold, perhaps at an ingress point into a keep-out zone or at a egress point from a safe zone. In the embodiment shown, beacon 124 may remain inactive until locator 110 moves into range, passively scanning at a predetermined interval for initial search signal emissions (i.e., search signal 114, later described) from locator 110. As configured, beacon(s) 124 may not transmit tracking signal(s) 122 during periods when locator 110 is absent from the area, thereby allowing the system 100 to conserve energy.

Locator 110 may periodically emit a search signal 114 configured to be detected by beacon 124 when locator 110 moves within range. When locator 110 comes into range, directional beacon 124 may detect the search signal 114, as shown in FIG. 1B. It should be recognized that, in other embodiments, these initial roles of locator 110 and directional beacon 124 may be reversed, such that directional beacon 124 periodically emits a tracking signal 122 while locator 110 passively searches for it, and locator 110 detects the tracking signal 122 when locator 110 moves within range of directional beacon 124. In some embodiments, search signal 114 (or tracking signal 122 when used as a search signal) may be emitted at a slower rate than the rate at which tracking signal 122 is emitted during bi-directional communication between locator 110 and beacon 124 while within range of one another, in order to conserve energy during the passive search phase.

Referring now to FIG. 1C, in various embodiments, directional beacon 124 may emit tracking signal 122 in response to detecting the locator search signal. Additionally or alternatively, in some embodiments, directional beacon 124 may wait until locator 110 has moved within a predetermined proximity before emitting its initial tracking signal 122 in response to the locator search signal 114. In such embodiments, directional beacon 124, upon detecting the locator search signal 114, may passively monitor the strength of the locator search signal 114 and calculate, based on the measured strength of the locator search signal 114, the proximity of the locator 110 to directional beacon 124. This may be accomplished utilizing known methods in the art. Once the calculated proximity falls within the predetermined proximity, directional beacon 124 may emit its tracking signal 122. In other embodiments, directional beacon 124 may wait until the measured strength of the locator search signal 114 exceeds a predetermined threshold before emitting its initial tracking signal 122 in response. In such embodiments, directional beacon 124 need not necessarily calculate the distance between it and locator 110, but rather may rely on signal strength alone as a trigger for its initial tracking signal 122 in response.

Tracking signal 122, in various embodiments, may be emitted at any suitable rate that allows locator 110 to monitor its proximity to the source beacon 124 and detect a breach of a proximity threshold associated therewith. In some embodiments, tracking signal 122 may be emitted at a fixed rate throughout all bi-directional communications with locator 100, and for example, at about every 100 ms to 350 ms. In some other embodiments, locator 110 may instruct beacon 124 to vary the rate at which tracking signal 122 is emitted based on its measured proximity to beacon 124, as later described. When system 100 includes multiple beacons 120, in some embodiments, the signal emission rates of the beacons 120 may be staggered somewhat to ensure that locator 110 may constantly be in contact with those beacons 120 that are in range, thereby allowing locator 110 to quickly validate apparent breaches, as later described.

Tracking signal 122, in various embodiments, may be emitted at any suitable signal strength that allows locator 110 to measure its proximity to the source beacon 124 when within a desired range. In some embodiments, tracking signal 122 may be configured to be detected at longer ranges, such as at about 70 meters away from beacon 124, and in other embodiments, may be configured to be detected at closer ranges, down to about 1 meter. Signal strength may be tailored for a given application of system 100 based on factors including, but not limited to, the size and geometry of the safe zone or keep out zone to be monitored by the particular beacon 124, and any obstructions or known atmospheric conditions that may affect the strength of the signal.

Tracking signal 122, in various embodiments, may contain an identifier of the particular beacon 124 from which it is emitted. The identifier, in an embodiment, may be utilized by locator 110 to identify the type of beacon 124 associated with tracking signal 122 (i.e., sentry beacon). Locator 110 may, in turn, utilize this information to look up parameters concerning the proximity threshold established by the particular beacon 120, thereby allowing locator 110 to determine subsequent signal configuration instructions to send to the particular beacon 124 based on its measured proximity thereto, and to detect a breach of the particular threshold. Locator 110 may also utilize the identifier to determine whether the tracking signal 122 is from an authorized beacon of system 100. Example identifiers include, but are not limited to, a Media Access Control (MAC) address, a Namespace ID, and an Instance ID.

Referring now to FIG. 1D, locator 110 may measure the strength of the received tracking signal 122 from directional beacon 124. In various embodiments, this measurement may take the form of a received signal strength indicator (RSSI) of the tracking signal 122 from directional beacon 124. While any suitable measurement of signal strength is envisioned, the present disclosure will refer to this measurement as RSSI from time to time for ease of reference. Locator 110, in some embodiments, may utilize the RSSI of tracking signal 122 to determine its spatial proximity to directional beacon 124 according to methods known in the art. Tracking signal 122 may be configured to include information concerning the power at which it was emitted from beacon 124, which locator 110 may in turn use to predict its proximity to beacon 124 based on measured signal strength. For example, beacon 124 may be set to broadcast at a given power (dB), and full signal strength is expected to be measurable at a given distance (meters). Locator 110 may measure RSSI of the signal, and extrapolate its physical proximity to beacon 124 by comparing the measured RSSI (dB) and expected signal range (meters). In other embodiments, locator 110 may forego spatial distance calculations, and instead compare the measured RSSI of tracking signal 122 to a known strength of the emitted beacon tracking signal 122 as a gauge of proximity.

Still referring to FIG. 1D, locator 110 may utilize the RSSI measurement of tracking signal 122 to determine how to change the configuration of subsequent tracking signals 122 from directional beacon 124. In particular, in various embodiments, it may be desirable to change the rate at which directional beacon 124 emits tracking signal 122 in order to facilitate locator 110 in determining when it has crossed the sentry threshold established by directional beacon 124. For example, in an embodiment in which directional beacon 124 acts as an ingress or egress point sentry, it may be desirable to increase the rate at which tracking signal 122 is emitted from directional beacon 124 as locator 110 gets closer and closer to directional beacon 124. In this way, locator 110 can rapidly sample multiple beacon tracking signals 122 to reliably detect the large RSSI drop-off in tracking signal 122 associated with locator 110 having crossed the sentry threshold established by directional beacon 124, as later described. In a representative embodiment, locator 110 may instruct beacon 124 to transmit tracking signal 122 every 350 ms at longer ranges, and periodically instruct beacon 124 to transmit at faster and faster intervals approaching 100 ms, for example, as locator 110 gets closer to the sentry threshold established by beacon 124.

Additionally or alternatively, it may be desirable to reduce the strength at which tracking signals 122 are emitted from directional beacon 124 as locator 110 gets closer and closer to directional beacon 124. Generally speaking, at further distances from beacon 124, there is a higher likelihood that tracking signal 122 may be affected by physical obstacles (e.g., furniture) and other impediments. Thus, the measured strength of tracking signal 122 at locator 110 may float more at longer ranges from beacon 124 as compared to the degree of float expected at closer ranges. Accordingly, locator 110 may be configured to instruct beacon 124 to emit tracking signal 122 at a higher signal strength when locator 110 is relatively far away to compensate for impediment-related or other causes of float, and at lower signal strengths when locator 110 is relatively closer. This may enhance the fidelity with which locator 110 can determine spatial proximity to directional beacon 110. In some cases, it can be easier to assess changes in the RSSI of tracking signal 122 at closer proximities when lower signal strengths are used compared with the much higher signal strengths used when locator 110 is more distal from directional beacon 124.

Upon determining a suitable configuration (e.g., combination of rate and strength) for subsequent tracking signals 122, locator 110 may send an instructional signal 112 to directional beacon 124 containing instructions to implement the associated configuration changes.

Referring now to FIG. 1E, directional beacon 124 may receive the instructional signal 112 from locator 110, and apply the associated configuration changes. Directional beacon 124 may emit tracking signals 122 in accordance with the instructed configuration changes until further instructed by locator 110.

Referring now to FIGS. 1F-1H, locator 110 may continue to receive tracking signals 122 from directional beacon 124, measure the RSSI of those tracking signals 122, and instruct directional beacon 124 accordingly in altering the configuration of tracking signals 122 as needed. In the representative embodiment shown, as locator 110 continues to get closer and closer to directional beacon 124, it instructs directional beacon 124 to further increase the rate at which tracking signals 122 are emitted and/or to further reduce the strength of beacon signal 122.

At FIG. 1H, locator 110 is very close to directional beacon 124 and about to cross the sentry threshold established by directional beacon 124.

Referring now to FIG. 1I, locator 110 has crossed the sentry threshold established by directional beacon 124. As such, even though directional beacon 124 is still emitting tracking signal 122 in accordance with the preceding configuration instruction, locator 110 may detect a sharp reduction in the strength of tracking signal 122 on the back side of directional beacon 124. For example, when locator is out in front of beacon 124 and at a safe range from the sentry threshold, RSSI may range between about −20 db to −79 db, with −20 db being a representative measurement just in front of beacon 124. As locator 110 passes across the sentry threshold established by beacon 124, the measured RSSI may begin to sharply transition, reaching between −80 db to −100 db, before dropping off beyond −100 db when locator 110 as moved beyond behind beacon 124 and beyond the sentry threshold. Upon detecting the sharp reduction in tracking signal 122 strength, locator 110 may notify an associated monitoring system of the event for initiation of protocol for responding to the event.

Tether Beacons 126

FIGS. 2A-2F illustrate a representative embodiment in which an omnidirectional beacon 126 may be utilized to detect when locator 110 has moved beyond a predetermined proximity threshold from omnidirectional beacon 126. In this way, omnidirectional beacon 126 may be utilized as a tether for detecting when locator 110 departs from safe zone around omnidirectional beacon 126.

The safe zone created by omnidirectional beacon 126, in various embodiments, may be stationary or mobile. For example, in a stationary embodiment, omnidirectional beacon 126 may be positioned at or proximate to a center of an area (e.g., room) to be designated as a safe zone, and the predetermined proximity threshold (also referred to herein as "tether threshold") set at approximately the diameter (or longest dimension) of the area. As configured, omnidirectional beacon 126 may monitor the proximity of locator 110 to the center of the safe zone, and determine when locator 110 has crossed the tether threshold and left the designated safe zone. In a mobile embodiment, for example, omnidirectional beacon 126 may be worn or carried by a person (e.g., a school chaperone), and the tether threshold set at a distance within which it is desired to keep a wearer or carrier of locator 110 (e.g., a child). It should be recognized that the present disclosure is not intended to be limited to any particular spatial definition of a safe zone, but rather envisions that tethered embodiments may serve to monitor the proximity of locator 110 to beacon 126, and detect when locator 110 has breached or is substantially likely to breach a tether threshold about omnidirectional beacon 126 based on movement, direction of travel, and/or learned past behavior.

Like the system of FIG. 1A, in various embodiments, beacon 126 may initially passively scan for periodic search signal 114 emissions from locator 110 until locator 110 comes into range. As configured, beacon(s) 126 may not transmit tracking signal(s) 122 during periods when locator 110 is absent from the area, thereby allowing the system 100 to conserve energy. Similarly, locator 110 may emit search signal 114 at a lower rate than the rate at which tracking signal 122 is emitted during bi-directional communication between locator 110 and beacon 126 while within range of one another, in order to conserve energy during the passive search phase. In other embodiments, as shown in FIG. 2A, omnidirectional beacon 126 may instead periodically emit an omnidirectional tracking signal 122 without first detecting a search signal 114 from locator 110.

Referring now to FIG. 2B, locator 110 may measure the strength (e.g., RSSI) of tracking signal 122 from omnidirectional beacon 126. Tracking signal 122, in various embodiments, may be emitted at any suitable rate that allows locator 110 to monitor its proximity to the source beacon 126 and detect a breach of a tether threshold associated therewith. In some embodiments, tracking signal 122 may be emitted at a fixed rate throughout all bi-directional communications with locator 110, and for example, at about every 100 ms to 350 ms. In some other embodiments, locator 110 may instruct beacon 126 to vary the rate at which tracking signal 122 is emitted based on its measured proximity to beacon 120, as later described. When system 100 includes multiple beacons 120, in some embodiments, the signal emission rates of the beacons 120 may be staggered somewhat to ensure that locator 110 may constantly be in contact with those beacons 120 that are in range, thereby allowing locator 110 to quickly validate apparent breaches, as later described.

Tracking signal 122, in various embodiments, may be emitted at any suitable signal strength that allows locator 110 to measure its proximity to the source beacon 126 when within a desired range. In some embodiments, tracking signal 122 may be configured to be detected at longer ranges, such as at about 70 meters away from beacon 126, and in other embodiments, may be configured to be detected at closer ranges, down to about 1 meter. Signal strength may be tailored for a given application of system 100 based on factors including, but not limited to, the size and geometry of the safe zone or keep out zone to be monitored by the particular beacon 126, and any obstructions or known atmospheric conditions that may affect the strength of the signal.

Tracking signal 122, in various embodiments, may contain an identifier of the particular beacon 126 from which it is emitted. The identifier, in an embodiment, may be utilized by locator 110 to identify the type of beacon 126 associated with tracking signal 122 (i.e., tether beacon). Locator 110 may, in turn, utilize this information to look up parameters concerning the proximity threshold established by the particular beacon 126, thereby allowing locator 110 to determine subsequent signal configuration instructions to send to the particular beacon 126 based on its measured proximity thereto, and to detect a breach of the particular threshold. Locator 110 may also utilize the identifier to determine whether the tracking signal 122 is from an authorized beacon of system 100. Example identifiers include, but are not limited to, a Media Access Control (MAC) address, a Namespace ID, and an Instance ID.

Locator 110 may measure the strength of the received tracking signal 122 from omnidirectional beacon 126. In various embodiments, this measurement may take the form of a received signal strength indicator (RSSI) of the tracking signal 122 from omnidirectional beacon 126. While any suitable measurement of signal strength is envisioned, the present disclosure will refer to this measurement as RSSI from time to time for ease of reference. Locator 110, in some embodiments, may utilize the RSSI of tracking signal 122 to determine its spatial proximity to omnidirectional beacon 126 according to methods known in the art. Tracking signal 122 may be configured to include information concerning the power at which it was emitted from beacon 126, which locator 110 may in turn use to predict its proximity to beacon 126 based on measured signal strength. For example, beacon 126 may be set to broadcast at a given power (dB), and full signal strength is expected to be measurable at a given distance (meters). Locator 110 may measure RSSI of the signal, and extrapolate its physical proximity to beacon 126 by comparing the measured RSSI (dB) and expected signal range (meters). In other embodiments, locator 110 may forego spatial distance calculations, and instead compare the measured RSSI of tracking signal 122 to a known strength of the emitted beacon tracking signal 122 as a gauge of proximity.

Still referring to FIG. 2B, locator 110 may utilize the RSSI measurement of tracking signal 122 to determine how to change the configuration of subsequent tracking signals 122 from omnidirectional beacon 126. In particular, in various embodiments, it may be desirable to change the rate at which omnidirectional beacon 126 emits tracking signal 122 in order to facilitate locator 110 in determining when it has crossed the tether threshold established by omnidirectional beacon 126. For example, in an embodiment, it may be desirable to increase the rate of at which tracking signals 122 are emitted from omnidirectional beacon 126 as locator 110 gets farther and farther away from omnidirectional beacon 126. In this way, locator 110 can rapidly sample multiple tracking signals 122 to reliably detect when the RSSI of tracking signals 122 has dropped to a level indicative of locator 110 having crossed the tether threshold established by omnidirectional beacon 126. In a representative embodiment, locator 110 may instruct beacon 126 to transmit tracking signal 122 every 350 ms at shorter ranges, and periodically instruct beacon 126 to transmit at faster and faster intervals approaching 100 ms, for example, as locator 110 gets farther away from beacon 126 and closer to the tether threshold established by beacon 126.

Additionally or alternatively, it may be desirable to increase the strength at which tracking signals 122 are emitted from omnidirectional beacon 126 as locator 110 gets farther and farther away from omnidirectional beacon 126. Generally speaking, at further distances from beacon 126, there is a higher likelihood that tracking signal 122 may be affected by physical obstacles (e.g., furniture) and other impediments. Thus, the measured strength of tracking signal 122 at locator 110 may float more at longer ranges from beacon 126 as compared to the degree of float expected at closer ranges. Accordingly, locator 110 may be configured to instruct beacon 126 to emit tracking signal 122 at a higher signal strength when locator 110 is relatively far away to compensate for impediment-related or other causes of float, and at lower signal strengths when locator 110 is relatively closer. This may enhance the fidelity with which locator 110 can determine spatial proximity to directional beacon 110, as it can be easier to assess changes in the RSSI of tracking signals 122 at further distances when higher signal strengths are used compared with the much lower signal strengths used when locator 110 is proximate to omnidirectional beacon 126.

Upon determining a suitable configuration (e.g., combination of rate and strength) for subsequent beacon tracking signals, locator 110 may send an instructional signal 112 to omnidirectional beacon 126 containing instructions to implement the associated configuration changes.

In some embodiments, locator 110 may not send an instruction signal 112 to omnidirectional beacon 126 until locator 110 detects that it has moved beyond a predetermined intermediate proximity threshold (also referred to herein as "drifting threshold") from omnidirectional beacon 126. In such embodiments, locator 110 may passively monitor the strength of tracking signal 122 and calculate, based on the measured strength of tracking signal 122, the proximity of the omnidirectional beacon 126 to locator 110. This may be accomplished utilizing known methods in the art. Once the calculated proximity exceeds the drifting threshold, locator 110 may emit its initial instructional signal 112 to omnidirectional beacon 126. In other embodiments, locator 110 may wait until the measured strength of tracking signal 122 exceeds a predetermined strength threshold (akin to drifting threshold) before emitting its initial instruction signal 112 to omnidirectional beacon 126. In such embodiments, locator 110 need not necessarily calculate the distance between it and omnidirectional beacon 126, but rather may rely on the strength of tracking signal 122 alone as a trigger for its initial instructional signal 112.

Referring now to FIG. 2C, omnidirectional beacon 126 may receive the instructional signal 112 from locator 110, and apply the associated configuration changes. Omnidirectional beacon 126 may emit tracking signals 122 in accordance with the instructed configuration changes until further instructed by locator 110.

Referring now to FIG. 2D, locator 110 may continue to receive tracking signals 122 from omnidirectional beacon 126, measure the RSSI of those signals 122, and instruct omnidirectional beacon 126 accordingly in altering its signal configuration as needed. In the representative embodiment shown, as locator 110 continues to get farther and farther from omnidirectional beacon 126, it instructs omnidirectional beacon 126 to further increase the rate at which tracking signals 112 are emitted and/or to further increase the strength of tracking signal 122. For example, when locator 110 is within a safe range of omnidirectional beacon 126, RSSI may range between about 20 db to about −79 db, with 20 db being a representative measurement proximate to beacon 126. As locator 110 moves farther from beacon 126 and approaches the tether threshold, the measured RSSI may continue to fade.

At FIG. 2D, locator 110 is distal from omnidirectional beacon 126 and about to cross the tether threshold established by omnidirectional beacon 126. Here, a representative RSSI may be about −79 db.

Referring now to FIG. 2E, locator 110 has crossed the tether threshold established by omnidirectional beacon 126. As such, locator 110 may detect a reduction in the strength of tracking signal 122 associated with the distance of locator 110 beyond the tether threshold. For example, RSSI may transition beyond −80 db, an RSSI consistent with the intended radius of the tether threshold. Upon detecting this event, locator 110 may notify an associated monitoring system of the event for initiation of protocol for responding to the event.

It should be recognized that, in other embodiments, the roles of locator 110 and omnidirectional beacon 126 may be reversed, such that locator 110 periodically emits a tracking signal 122, and omnidirectional beacon 126 monitors the locator tracking signal 122 and sends a corresponding instructional signal 112 to locator 110.

Multiple Beacon Embodiments

FIGS. 3-5 illustrate representative configurations in which a combination of multiple beacons 120 may be utilized to establish safe zones and/or keep-out zones of various shapes and sizes. Each is shown and described in the context of representative building floor plans, though it should be recognized that the principles described herein may be applied to form any number of suitable arrangements of beacons 120 for creating safe/keep-out zones in any suitable environment.

Additionally or alternatively, combinations of multiple beacons 120 may be utilized to validate apparent breaches detected by one or more of the beacons 120. In some cases, a person, pet, or other object may move between locator 110 and a given beacon 120, causing a reduction in measured RSSI by locator 110 that may cause locator 110 to believe it has, depending on the configuration, breached a sentry or tether threshold defined by the given beacon 120. To add robustness to system 100, multiple beacons 120 may be arranged such that at least two beacons 120 can be in communication with locator 110 at all times within a given safe zone or outside of a given keep-out zone. In this way, if one of the beacons 120 (i.e., beacon 120a) detects an apparent breach of its sentry or tether threshold, locator 110 may reference its proximity to the at least one other beacon 120 with which it is in communication (i.e., beacon 2), to determine whether the measured proximity of locator 110 with respect to beacon 2 is consistent a breach of the sentry/tether threshold of beacon 1 having occurred, as described in more detail below.

FIG. 3 illustrates a representative configuration in which two directional beacons 124a, 124b are arranged to act as sentries at Door A and Door B, respectively. Door A is an egress point from the floor plan, outside of which may be considered a keep-out zone (indicated by the triangular danger symbol). Door B is an ingress point into a small room within the floor plan that is designated as a keep-out zone (indicated by the triangular danger symbol). The remaining L-shaped portion of the floor plan is designated as a safe zone (indicated by the dotted background pattern). Directional beacon 124a provides coverage from the left wall to the right wall of the floor plan, and directional beacon 124b provides additional coverage across the left half of the floor plan. Combined, beacon 124a and 124b define an overall L-shaped safe zone within the floor plan.

Directional beacons 124a, 124b have overlapping tracking signal fields in the vicinities of both Door A and Door B. In this way, should locator 110 detect an apparent breach of sentry threshold A near Door A, locator 110 may first reference its measured proximity to beacon 124b near Door B to determine if that measured proximity is consistent with locator 110 having exited the floor plan through Door A. If the measured proximity of locator 110 to beacon 124b is consistent with locator 110 being within the floor plan, then locator 110 may not trigger a breach alert; however, if the measured proximity of locator 110 to beacon 124b is consistent with locator 110 being beyond the floor plan, then locator 110 may trigger a breach alert.

Similarly, should locator 110 detect an apparent breach of sentry threshold B near Door B, locator 110 may first reference its measured proximity to beacon 124a near Door A to determine if that measured proximity is consistent with locator 110 having entered the keep-out zone within the floor plan through Door B. If the measured proximity of locator 110 to beacon 124a is consistent with locator 110 being outside of the keep-out zone within the floor plan through Door B, then locator 110 may not trigger a breach alert; however, if the measured proximity of locator 110 to beacon 124a is consistent with locator 110 being inside of the keep-out zone within the floor plan through Door B, then locator 110 may trigger a breach alert.

FIG. 4 illustrates another representative configuration similar to that of FIG. 3; however, Door B is now positioned along a top wall of the internal keep-out zone room. In this configuration, directional beacons 124a, 124b have substantially overlapping coverage near Door B, but not near Door A. Accordingly, omnidirectional beacon 126a has been added to provide validation of beacon 124a at Door A.

In particular, should locator 110 detect an apparent breach across sentry threshold A, locator 110 may first reference its measured proximity to omnidirectional beacon 126a to determine if that measured proximity is consistent with locator 110 having exited the floor plan through Door A. If the measured proximity of locator 110 to beacon 126a is consistent with locator 110 being within the floor plan, then locator 110 may not trigger a breach alert; however, if the measured proximity of locator 110 to beacon 126a is consistent with locator 110 being beyond the floor plan, then locator 110 may trigger a breach alert.

It should be recognized that omnidirectional beacon 126a may further be used to provide additional validation robustness at Door B. Should locator 110 detect an apparent breach across sentry threshold B, it may first reference its measured proximity to one or both of omnidirectional beacon 126a and directional beacon 124a to determine if that (or those) measured proximit(ies) is consistent with locator 110 having entered the internal keep-out zone through Door B. If the measured proximity of locator 110 to beacon 126a and/or beacon 124b is consistent with locator 110 being within the safe zone, then locator 110 may not trigger a breach alert; however, if the measured proximit(ies) is consistent with locator 110 being inside the internal keep-out zone, then locator 110 may trigger a breach alert.

FIG. 5 illustrates yet another representative configuration in which three omnidirectional beacons 126a, 126b, 126c are arranged to act as tethers, with their combined tracking signal fields covering the entire L-shaped safe zone within the floor plan. Omnidirectional beacon 126a provides tracking signal coverage across the entire safe zone, omnidirectional beacon 126b provides additional tracking signal coverage across the top half of the floor plan, and omnidirectional beacon 126c provides additional tracking signal coverage across the left half of the floor plan. A tether threshold A of beacon 126a is configured to extend to Door A, and a tether threshold B of beacon 126b is configured to extend to Door B. Beacon 126c, in an embodiment, may be used for validation purposes only, but could conceivably be configured with a suitable tether threshold C (not shown), such as one extending to Door A.

Similar to FIG. 4, Door A is an egress point from the floor plan, outside of which may be considered a keep-out zone (indicated by the triangular danger symbol). Door B is an ingress point through the top wall of a small room within the floor plan that is designated as a keep-out zone (indicated by the triangular danger symbol). The remaining L-shaped portion of the floor plan is designated as a safe zone (indicated by the dotted background pattern).

Omnidirectional beacons 126a, 126b have overlapping tracking signal fields in the vicinities of both Door A and Door B. In this way, should locator 110 detect an apparent breach of tether threshold B, locator 110 may first reference its measured proximity to beacon 126a to determine if that measured proximity is consistent with locator 110 having entered the keep-out zone through Door B. It should be recognized that, in many cases, the breach of tether threshold B may not be the result of locator 110 having moved through Door B, but rather the result of locator 110 having moved leftward beyond tether threshold B to a position as shown. In such cases, it would not be appropriate to trigger a keep-out zone breach alert, as locator 110 is still within the established safe zone. Accordingly, locator 110 may be configured to reference its measured proximity to beacon 126a to determine whether it has indeed moved leftward (meaning it has a closer proximity to beacon 126a), or rather has moved through Door B (meaning it has a further proximity from beacon 126b). In the former case, locator 110 may not trigger a breach alert; however, in the latter, locator 110 may trigger a breach alert.

The combination of beacons 126b, 126c may be used to validate apparent breaches of tether threshold A through Door A. Given the L-shape of the safe zone in the present example, beacon 126b could conceivably detect when locator 110 causes a false breach of tether threshold A by moving in a rightward direction to the position shown, similar to the way beacon 126a could detect a false breach of tether threshold B by moving in a leftward direction. However, because tether threshold A could conceivably be breached by moving downward within the left half of the safe zone, the lack of signal coverage from beacon 126b into the area may prevent it from providing reliable validation. Accordingly, locator 110 may reference its measured proximity to both beacons 126b and 126c to determine whether its apparent breach of tether threshold A is consistent with remaining within the safe zone, or rather is consistent with having passed through Door A out of the safe zone.

Example Applications

Systems and methods of the present disclosure may have numerous applications. In some embodiments, system 100 may be utilized to establish safe zones and/or keep-out zones to detect when a person or pet wearing locator 110 has wandered off, gone missing, or entered an area known to have hazards, such as a chemical storage closet or area containing water hazards such as a swimming pool, river or lake. Such applications may be particularly beneficial when employed to remotely monitor safe zones and/or keep-out zones established for protecting the personal safety of targets such as children, elderly persons, or persons suffering from cognitive aliments such as Alzheimer's or autism.

In various embodiments, systems and methods of the present disclosure may have consumer applications in homes, assisted living centers, schools, and other environments having children, elderly persons, pets or others that may be prone to wandering off or being injured by attractive nuisances such as swimming pools, household chemicals, etc. In such applications, systems and methods of the present disclosure may be used by caregivers or other persons responsible for the safety and well-being of a particular target to detect and/or respond to such events. In some real-world applications, embodiments of the present disclosure may allow at-risk targets and their caretakers to maintain greater autonomy and flexibility in their daily lives by providing a reliable way to detect and coordinate responses to events that may otherwise require the target to be placed under closer supervision.

In some embodiments, locator 110 may be configured to transmit a zone breach alert directly or indirectly to a remote monitoring system. In one such embodiment, locator 110 may wirelessly transmit the zone breach alert to a local area network (LAN) supported by a base station or similar device on the premises, which may in turn transmit the zone breach alert and other relevant information to the remote monitoring system via a wired or wireless wide area network (WAN). In another embodiment, locator 110 may wirelessly transmit the zone breach alert directly to the remote monitoring system via long-range wireless communications to a satellite, cellular tower, or other WAN.

In some embodiments, locator 110 may further transmit information about its location so that it may be tracked via GNSS or other location-tracking technologies after the zone breach. As configured, locator 110 of system 100 may be used in facilitating coordinated responses to the event by caregivers, public responders, and/or private service responders.

In various embodiments, system 100 may be utilized to detect events and facilitate coordinated responses thereto as set forth in U.S. patent application Ser. No. 15/067,667, entitled "Systems and Methods for Intelligent Event Response" filed Mar. 11, 2016, which is hereby incorporated by reference in its entirety for all purposes.

Notwithstanding the illustrative examples described above, one of ordinary skill in the art will recognize any number of situations within the scope of the present disclosure that may be understood as events to which the systems and methods described herein may be used in facilitating a coordinated response.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A system for detecting a breach of a proximity threshold, the system comprising:
   a first electronic device configured to transmit a wireless signal; and
   a second electronic device configured to:

measure a strength of the wireless signal transmitted from the first electronic device, determine, based on the measured strength of the wireless signal transmitted from the first electronic device, a proximity of the second electronic device to the first electronic device, compare the proximity of the second electronic device to the first electronic device with a proximity threshold associated with the first electronic device to determine a proximity of the second electronic device to the proximity threshold, instruct the first electronic device, via a wireless signal transmitted from the second electronic device, to transmit subsequent wireless signals from the first electronic device at a predetermined interval corresponding with the proximity of the second electronic device to the proximity threshold associated with the first electronic device, and measure a strength of the subsequent wireless signals being transmitted at the predetermined interval from the first electronic device to detect when the second electronic device breaches the proximity threshold associated with the first electronic device, wherein the predetermined interval is faster when the second electronic device is in a closer determined proximity to the proximity threshold, and slower when the second electronic device is at a farther determined proximity from the proximity threshold.

2. A system for detecting a breach of a proximity threshold, the system comprising:

a first electronic device configured to transmit a wireless signal; and a second electronic device configured to:

measure a strength of the wireless signal transmitted from the first electronic device, determine, based on the measured strength of the wireless signal transmitted from the first electronic device, a proximity of the second electronic device to the first electronic device, compare the proximity of the second electronic device to the first electronic device with a proximity threshold associated with the first electronic device to determine a proximity of the second electronic device to the proximity threshold, instruct the first electronic device, via a wireless signal transmitted from the second electronic device, to transmit subsequent wireless signals from the first electronic device at a predetermined interval corresponding with the proximity of the second electronic device to the proximity threshold associated with the first electronic device, and measure a strength of the subsequent wireless signals being transmitted at the predetermined interval from the first electronic device to detect when the second electronic device breaches the proximity threshold associated with the first electronic device, wherein the second electronic device is further configured to instruct, via the wireless signal transmitted from the second electronic device, the first electronic device to subsequently transmit the subsequent wireless signals at a predetermined transmission strength corresponding with the proximity of the second electronic device to the proximity threshold associated with the first electronic device, and wherein the predetermined transmission strength is lesser when the second electronic device is in a closer determined proximity to the first electronic device, and greater when the second electronic device is at a farther determined proximity from the first electronic device.

3. A system for detecting a breach of a proximity threshold, the system comprising:

a first electronic device configured to transmit a wireless signal; and a second electronic device configured to:

measure a strength of the wireless signal transmitted from the first electronic device, determine, based on the measured strength of the wireless signal transmitted from the first electronic device, a proximity of the second electronic device to the first electronic device, compare the proximity of the second electronic device to the first electronic device with a proximity threshold associated with the first electronic device to determine a proximity of the second electronic device to the proximity threshold, instruct the first electronic device, via a wireless signal transmitted from the second electronic device, to transmit subsequent wireless signals from the first electronic device at a predetermined interval corresponding with the proximity of the second electronic device to the proximity threshold associated with the first electronic device, and measure a strength of the subsequent wireless signals being transmitted at the predetermined interval from the first electronic device to detect when the second electronic device breaches the proximity threshold associated with the first electronic device, further including a third electronic device configured to transmit a wireless signal, and wherein the second electronic device is further configured to:

measure a strength of the wireless signal transmitted from the third electronic device, determine, based on the measured strength of the wireless signal transmitted from the third electronic device, a proximity of the second electronic device to the third electronic device, compare, in response to an apparent breach by the second electronic device of the proximity threshold associated with the first electronic device, the proximity of the second electronic device to the third electronic device to validate the apparent breach.

4. A method for detecting a breach of a proximity threshold, the method comprising:

transmitting, with a first electronic device, a wireless signal;

measuring, with a second electronic device, a strength of the wireless signal transmitted from the first electronic device;

determining, based on the measured strength of the wireless signal transmitted from the first electronic device, a proximity of the second electronic device to the first electronic device;

comparing the proximity of the second electronic device to the first electronic device with a proximity threshold associated with the first electronic device to determine a proximity of the second electronic device to the proximity threshold;

instructing the first electronic device, via a wireless signal transmitted from the second electronic device, to transmit subsequent wireless signals from the first electronic device at a predetermined interval corresponding with the proximity of the second electronic device to the proximity threshold associated with the first electronic device; and measuring, with the second electronic device, a strength of the subsequent wireless signals being transmitted at the predetermined interval from the first electronic device to detect when the second electronic device breaches the proximity threshold associated with the first electronic device, wherein the predetermined interval is faster when the second electronic device is in a closer determined proximity to the proximity threshold, and slower when the second electronic device is at a farther determined proximity from the proximity threshold.

5. A method for detecting a breach of a proximity threshold, the method comprising:

transmitting, with a first electronic device, a wireless signal;

measuring, with a second electronic device, a strength of the wireless signal transmitted from the first electronic device;

determining, based on the measured strength of the wireless signal transmitted from the first electronic device, a proximity of the second electronic device to the first electronic device;

comparing the proximity of the second electronic device to the first electronic device with a proximity threshold associated with the first electronic device to determine a proximity of the second electronic device to the proximity threshold;

instructing the first electronic device, via a wireless signal transmitted from the second electronic device, to transmit subsequent wireless signals from the first electronic device at a predetermined interval corresponding with the proximity of the second electronic device to the proximity threshold associated with the first electronic device; and measuring, with the second electronic device, a strength of the subsequent wireless signals being transmitted at the predetermined interval from the first electronic device to detect when the second electronic device breaches the proximity threshold associated with the first electronic device, wherein the step of instructing further includes instructing, via the wireless signal transmitted from the second electronic device, the first electronic device to subsequently transmit the subsequent wireless signals at a predetermined transmission strength corresponding with the proximity of the second electronic device to the proximity threshold associated with the first electronic device, and wherein the predetermined transmission strength is lesser when the second electronic device is in a closer determined proximity to the first electronic device, and greater when the second electronic device is at a farther determined proximity from the first electronic device.

6. A method for detecting a breach of a proximity threshold, the method comprising:

transmitting, with a first electronic device, a wireless signal;

measuring, with a second electronic device, a strength of the wireless signal transmitted from the first electronic device;

determining, based on the measured strength of the wireless signal transmitted from the first electronic device, a proximity of the second electronic device to the first electronic device;

comparing the proximity of the second electronic device to the first electronic device with a proximity threshold associated with the first electronic device to determine a proximity of the second electronic device to the proximity threshold;

instructing the first electronic device, via a wireless signal transmitted from the second electronic device, to transmit subsequent wireless signals from the first electronic device at a predetermined interval corresponding with the proximity of the second electronic device to the proximity threshold associated with the first electronic device; and measuring, with the second electronic device, a strength of the subsequent wireless signals being transmitted at the predetermined interval from the first electronic device to detect when the second electronic device breaches the proximity threshold associated with the first electronic device, further including:

transmitting, with a third electronic device, a wireless signal;

measuring, with the second electronic device, a strength of the wireless signal transmitted from the third electronic device;

determining, based on the measured strength of the wireless signal transmitted from the third electronic device, a proximity of the second electronic device to the third electronic device;

comparing, in response to an apparent breach by the second electronic device of the proximity threshold associated with the first electronic device, the proximity of the second electronic device to the third electronic device to validate the apparent breach.

* * * * *